(12) United States Patent
Leopold (10) Patent No.: US 7,947,901 B2
(45) Date of Patent: May 24, 2011

(54) ENVIRONMENTALLY SEALED WIRING DEVICE WITH INTEGRAL WEATHER-RESISTANT COVER

(75) Inventor: Howard S. Leopold, Fayetteville, GA (US)

(73) Assignee: Cooper Technologies Company, Houston, TX (US)

( * ) Notice: Subject to any disclaimer, the term of this patent is extended or adjusted under 35 U.S.C. 154(b) by 286 days.

(21) Appl. No.: 12/242,042

(22) Filed: Sep. 30, 2008

(65) Prior Publication Data
US 2010/0078190 A1 Apr. 1, 2010

(51) Int. Cl.
*H02G 3/08* (2006.01)
(52) U.S. Cl. ............... 174/50; 174/58; 174/66; 174/67; 439/535; 248/906
(58) Field of Classification Search ............ 174/50, 174/66, 67, 58; 220/4.02, 3.8; 439/535; 248/906
See application file for complete search history.

(56) References Cited

U.S. PATENT DOCUMENTS

| | | | |
|---|---|---|---|
| 3,186,574 A | 6/1965 | Davidson | |
| 4,915,638 A | 4/1990 | Domian | |
| 4,988,832 A | 1/1991 | Shotey | |
| 5,228,584 A | 7/1993 | Williams, Jr. | |
| 5,317,109 A | 5/1994 | Aldissi | |
| 5,387,761 A | 2/1995 | Simonis | |
| 5,527,993 A | 6/1996 | Shotey et al. | |
| 5,533,637 A | 7/1996 | Williams, Jr. | |
| 5,621,192 A | 4/1997 | Bordwell et al. | |
| 5,773,760 A | 6/1998 | Stark et al. | |
| 6,028,268 A | 2/2000 | Stark et al. | |
| 6,519,208 B2 * | 2/2003 | DeVries | 368/10 |
| 7,381,890 B1 * | 6/2008 | Kinnard et al. | 174/50 |
| 7,479,598 B1 * | 1/2009 | Shotey et al. | 174/58 |
| 7,619,162 B2 * | 11/2009 | Dinh et al. | 174/58 |
| 2010/0078189 A1 | 4/2010 | Leopold | |

* cited by examiner

*Primary Examiner* — Dhiru R Patel
(74) *Attorney, Agent, or Firm* — King & Spalding LLP (57) ABSTRACT

A sealed device with integral weatherproof cover includes a device integral with a weatherproof cover to prevent the introduction of moisture into the device. A portion of the device is positioned within the weatherproof cover housing. The device includes wires extending out through one or more openings along or near the back of the device. The openings are environmentally sealed around the wires to prevent moisture from passing therethrough. The weatherproof cover housing includes a pair of openings. A portion of the device is positioned next to, and sometimes through, one of the openings. A door is coupled to the weatherproof cover housing and positioned adjacent the other opening. The door can be moved about an axis along an edge of the weatherproof cover housing such that the door can be adjusted between an open position and a closed position about the second opening.

20 Claims, 6 Drawing Sheets

ENVIRONMENTALLY SEALED WIRING DEVICE WITH INTEGRAL WEATHER-RESISTANT COVER

CROSS-REFERENCE TO RELATED APPLICATION

The present application is related to the following co-pending application: U.S. patent application Ser. No. 12/242,075, filed on Sep. 30, 2008, the disclosure of which is incorporated herein by reference.

FIELD OF THE INVENTION

The present invention relates generally to the field of electrical outlet devices. More particularly, the invention relates to an environmentally sealed wiring device with integral weatherproof cover.

BACKGROUND

Weatherproof covers for protecting devices installed outdoors, such as receptacles and switches, against the effects of the elements (e.g., rain, moisture, and dust) are well known. Typically, such covers include a housing and a hingable door that is sized to receive a portion of a device, such as a ground fault circuit interrupter device ("GFCI"), single gang receptacle, or double gang receptacles and the like. The weatherproof cover can be attached to a wallbox or electrical outlet box that houses the remaining portion of the electrical device, and incorporates a gasket material placed between the weatherproof cover and the outlet box or wall surface.

The device typically includes one or more terminals along its back or side surface for electrically coupling wires to an electrical source, switch, or device. The door portion for the weatherproof cover can have openings for electrical cables, so that the door can be closed even when cables are attached to the device, e.g., when an electrical plug is attached to a receptacle. Examples of the foregoing enclosures can be found in U.S. Pat. Nos. 6,028,268 and 5,773,760 to Stark et al.; U.S. Pat. Nos. 5,533,637 and 5,228,584 to Williams, Jr.; U.S. Pat. No. 5,317,109 to Prairie, Jr.; and U.S. Pat. No. 4,915,638 to Domian.

The weatherproof covers of the prior art, however, have a disadvantage in that when water seeps in between the weatherproof cover and the structure the weatherproof cover is attached to, the water is able to reach the device. This water is able to penetrate the device and potentially cause a short circuit situation. Another disadvantage is that, when the water seeps between the structure and the weatherproof cover, the water can make its way along the top of the wallbox and into the wallbox through the openings intended to allow for wiring connections. From there, the water can gain access to the device and cause a short circuit.

What is needed in the art is a method and apparatus for environmentally sealing the device to the weatherproof cover, and sealing the housing of the device behind the weatherproof cover, thereby preventing water from penetrating the device.

SUMMARY OF THE INVENTION

A sealed device with integral weatherproof cover provides improved protection for wiring devices, such as GFCI outlets, from the elements, including water. The sealed device with integral weatherproof cover includes a wiring device and wires, for coupling to electrical sources, switches, junction boxes or the like. The wires may extend through openings in the device. These openings are environmentally sealed from the elements to prevent moisture or other contaminants from entering the interior of the device. The device can be integrally coupled to a weatherproof cover housing having walls and a faceplate. The weatherproof cover can also include a door that is attached to the weatherproof cover housing by way of a rotatable coupling member and can be rotated from an open position to a closed positioned. In the closed position the door can engage the weatherproof cover housing and provide a weatherproof seal therebetween.

For one aspect of the present invention, a sealed device with integral weatherproof cover can include a wiring device environmentally sealed to a weatherproof cover to prevent the introduction of moisture into the wiring device from between the wiring device and the weatherproof cover. The wiring device can include one or more wires extending out from the wiring device through one or more apertures. The apertures can be environmentally sealed around the wires to prevent moisture from passing into the wiring device through the apertures. The weatherproof cover housing can include a pair of openings, and a portion of the wiring device can be positioned next to one of the openings. A door can be rotatably coupled to the weatherproof cover housing and positioned next to the other opening in the weatherproof cover housing. The door can be moved about an axis such that the cover can be adjusted between an open position and a closed position.

For another aspect of the present invention, a sealed device with integral weatherproof cover can include a wiring device environmentally sealed to a weatherproof cover to prevent the introduction of moisture into the wiring device. The wiring device can include a single gang electrical receptacle. The single gang electrical receptacle can include one or more receptacles that can be coupled and decoupled to a plug or other electrical connector. The wiring device can also include a device body and one or more wires. The wires can include a first end, a second end, and a portion between each of the ends. The first end of the wire can be electrically coupled to the single gang electrical receptacle. The portion of the wire between each end can extend through an opening in the device body. The opening can be environmentally sealed around the portion of the wire extending therethrough to prevent moisture from passing into the device body. The weatherproof cover housing can include a pair of openings. A portion of the single gang electrical receptacle can be positioned next to one of the openings. A door can be rotatably coupled to the weatherproof cover housing. The door can be operable between an open position and a closed position. In the closed position the door can be adjacent the other opening in the weatherproof cover housing.

For yet another aspect of the present invention, a sealed device with integral weatherproof cover can include a weatherproof cover environmentally sealed to a wiring device to prevent the introduction of moisture into the wiring device. The wiring device can include a GFCI device receptacle. The GFCI device receptacle can include one or more receptacles that are coupled and decoupled to a plug or other electrical connector. The wiring device can also include a device body and one or more wires. The wires can include a first end, a second end, and a portion between each of the ends. The first end of the wire can be electrically coupled to the GFCI device receptacle. The portion of the wire between each end can extend through an opening in the device body. The opening can be environmentally sealed around the portion of the wire extending therethrough to prevent moisture from passing into the wiring device. The weatherproof cover housing can include an opening through which a portion of the GFCI device receptacle can extend. A door can be rotatably coupled to the weatherproof cover housing. The door can be operable between an open position and a closed position.

BRIEF DESCRIPTION OF THE DRAWINGS

For a more complete understanding of the exemplary embodiments of the present invention and the advantages thereof, reference is now made to the following description in conjunction with the accompanying drawings in which.

DETAILED DESCRIPTION OF THE EXEMPLARY EMBODIMENTS

The present invention is directed to a sealed device with integral weatherproof cover for preventing the introduction of moisture into the device. The inventive functionality of the sealed device with integral weatherproof cover will be explained in more detail in the following description and is disclosed in conjunction with the presented figures.

Referring now to the drawings in which like numerals represent like elements throughout the several figures, aspects of the present invention will be described. FIGS. 1-4 show perspective views of the sealed device with integral weatherproof cover (hereinafter "weatherproof cover") 100 according to one exemplary embodiment of the present invention. Now referring to FIGS. 1-4, the exemplary weatherproof cover 100 includes a weatherproof cover housing 102 that is integral with a device 104. In one exemplary embodiment, the device 104 can include wiring devices including, but not limited to, electrical outlet receptacles and/or a GFCI device.

The weatherproof cover 100 is customarily mounted in a vertical or upright position, since devices that would be covered by the weatherproof cover 100 are generally oriented vertically with respect to a support structure (e.g. a wall) to which the weatherproof cover 100 is attached. Based on the foregoing, the terms top, bottom, side, upper, lower, front, rear, left, and right, as used herein with respect to the weatherproof cover 100 are to be understood in the context of the weatherproof cover 100 being in an upright or vertical position as shown in FIGS. 1-4.

In certain exemplary embodiments, the weatherproof cover housing 102 and the device 104 are integral to one-another by molding the weatherproof cover housing 102 and the device 104 from plastic in a single molding process. In an alternative embodiment, the weatherproof cover housing 102 and device 104 are coupled during the manufacturing process. Those of ordinary skill in the art will recognize that several exemplary methods may be used to couple the weatherproof cover housing 102 to the device 104 including, but not limited to, a combination of fasteners and weatherproof caulking, an adhesive between the front of the device 104 and the back side 114 of the weatherproof cover housing 102, welding, and other known methods. In these exemplary embodiments, the device 104 and the weatherproof cover housing 102 are made integral or unitary prior to being offered for purchase at retail and are not generally capable of being separated from one another. In one exemplary embodiment, the coupling or interface 105 between the weatherproof cover housing 102 and the device 104 is environmentally sealed, making the coupling or interface 105 impervious to water or other environmental contaminants.

Figure 3:
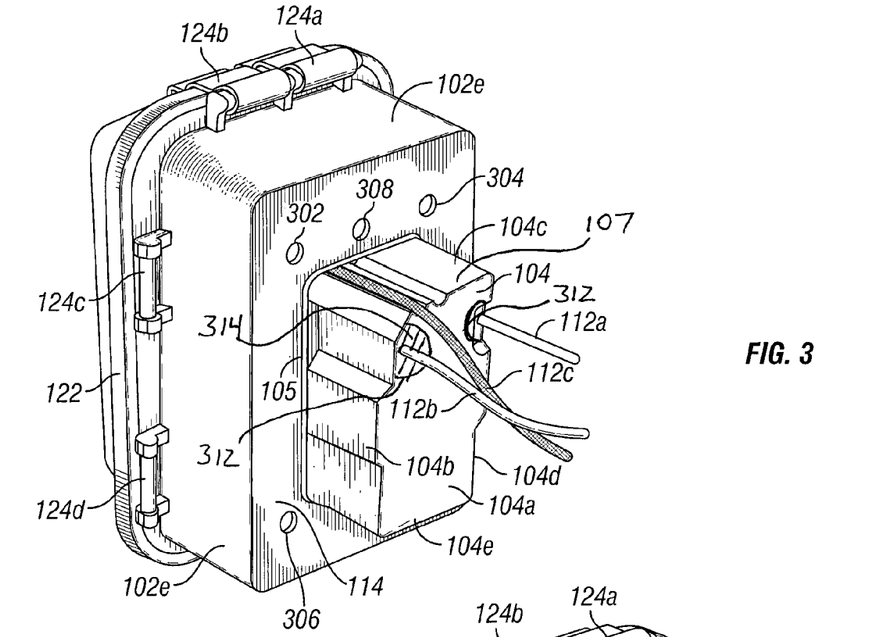
FIG. 3 is a rear perspective view of the sealed device with integral weatherproof cover in accordance with one exemplary embodiment of the present invention.

The device 104 has a six-sided generally box-like shape as shown in FIG. 3; however, the device 104 could have other geometrical shapes including, but not limited to, oval or circular with, or without, raised sides extending therefrom. The device 104 typically has a length, width, and depth sufficient in size to allow the device 104 to be placed within a wallbox (not shown). In one exemplary embodiment, the device 104 is dimensioned (i.e., sized, shaped, constructed, and arranged) to include a single gang receptacle 102a and 102b on the front side of the device 104. However, it is to be understood that a device 104 dimensioned to include smaller (e.g., a toggle switch) or larger (e.g., a double gang receptacle) sized devices is within the spirit of the present invention.

The exemplary device 104 includes a device body 107 that includes, for example, a back plate 104a having a generally rectangular shape and four walls 104b, 104c, 104d, and 104e. The four walls 104b, 104c, 104d, and 104e are each typically coupled on one end to and extend out from the back plate 104a and are coupled along the opposing end to, or integral with, the back side 114 of the faceplate 102f. In one exemplary embodiment, the back plate 104a and walls 104b, 104c, 104d, and 104e are integral to one another and environmentally sealed. While the back plate 104a is generally described as having a generally rectangular shape, the back plate 104a can be modified to have other geometric shapes and the number of walls 104b, 104c, 104d, and 104e extending out from the back plate 104a can be modified to comport with the shape of the back plate 104a or the particular needs of the application.

The exemplary device 104 also includes one or more wires (or electrical cables) extending out from openings 312 in the device 104. In one exemplary embodiment, the wires include a hot wire lead 112a, a neutral wire lead 112b, and a ground wire lead 112c extending out from the back plate 104a and/or the top wall 104c of the device 104. Those of ordinary skill in the art will recognize that one or more of the wire leads 112a, 112b, and 112c can alternatively pass through the side or bottom walls 104b, 104d, and 104e of the device body 107. The opening 312 where the wire leads 112a, 112b, and 112c pass through the device 104 is generally environmentally sealed in such a way as to prevent liquid from being able to pass along the wire leads 112a, 112b, and 112c and into the device 104. In one exemplary embodiment, the wire leads 112a, 112b, and 112c are environmentally sealed though the use of a solvent 314 applied about the particular wire at the opening 312; however, those of ordinary skill in the art will recognize that other methods of sealing the openings 312 exists including, but not limited to, welding, ultrasonic welding, pressure fitting, and cork. Each of the wire leads 112a, 112b, and 112c are coupled on their opposing ends to the single gang receptacle 102a and 102b or other device along the front of the device 104.

Figure 1:
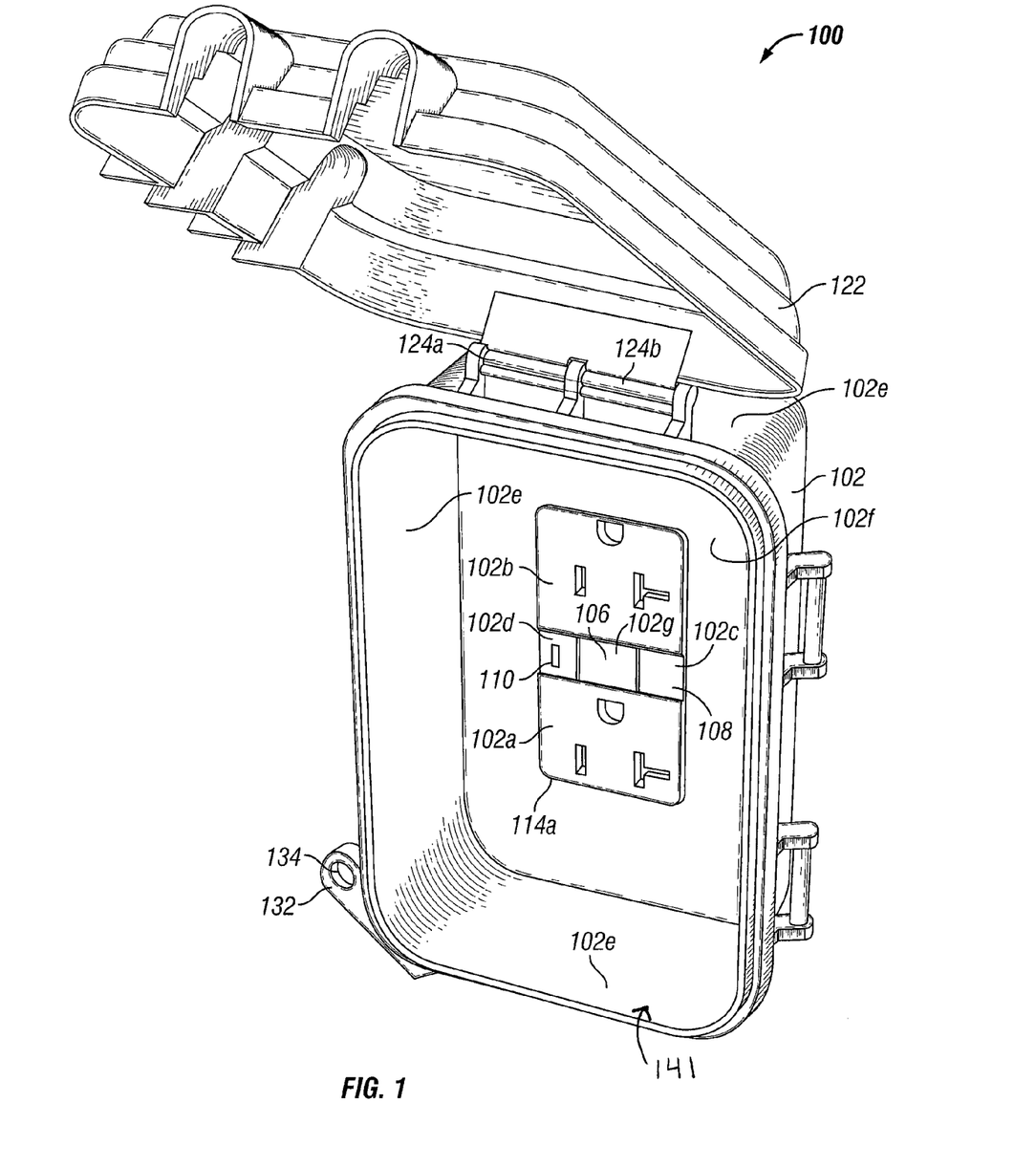
FIG. 1 is a front perspective view of a sealed device with integral weatherproof cover in an open configuration according to one exemplary embodiment of the present invention.

The weatherproof cover housing 102 has a five-sided generally box-like shape as shown in FIG. 1; however, the weatherproof cover housing 102 could have other geometric shapes including, but not limited to, oval and circular shapes with raised sides extending out therefrom. In certain exemplary embodiments, the weatherproof cover housing 102 has a length width, and depth sufficient in size to enable a door 122 to be closed even when the electrical connectors (e.g., plugs, electrical cables) are connected to a device receptacle 102a or 102b. In one exemplary embodiment, the weatherproof cover housing 102 is dimensioned (i.e., sized, shaped, constructed, and arranged) to allow it to be used with a single gang receptacle 102a and 102b of the integral device 104. However, it is to be understood that a weatherproof cover housing 102 dimensioned for use with smaller (e.g., a toggle switch) or larger (e.g., a double gang receptacle) sized devices is within the spirit of the present invention.

The exemplary recessed weatherproof cover housing 102 includes a faceplate 102f having a generally rectangular shape and four walls 102e coupled to and extending out from the faceplate 102f and defining an opening 141. In one exemplary embodiment, the recessed weatherproof cover housing 102 is made of molded plastic and the faceplate 102f and walls 102e are integral to one another and environmentally sealed. While the weatherproof cover housing 102 is described in the exemplary embodiment as being made from plastic, other materials known in the art may be used in the manufacture of the weatherproof cover housing 102 including, but not limited to, composites and metallic or semi-metallic materials. Furthermore, while the faceplate 102f is described as having a generally rectangular shape, the faceplate 102f can be modified to have other geometric shapes and the number of walls 102e extending out from the faceplate 102f can be modified to comport with the shape of the faceplate 102f.

The weatherproof cover housing 102 also is capable of receiving a portion of the device receptacles 102a and 102b, and openings 102c, 102d, and 102g of the device 104 through the opening 114a. Each of the device receptacle outlets 102a and 102b is adapted to receive a two-prong or three-prong electrical plug and, in combination, are generally referred to as a single gang electrical receptacle. The exemplary device 104 can also include a reset button 106 and a test button 108 extending into and/or through the openings 102g and 102c respectively, and an end of a light pipe 110 extending into and/or through the opening 102d. The weatherproof cover housing 102 may also include one or more exemplary mounting holes 302-308 (with a fifth and sixth mounting hole not shown) (of FIG. 3) along the surface of the faceplate 102f. The mounting holes 302-308 may be used in conjunction with a fastener, (i.e., screw, nail, rivet, etc.) to couple the weatherproof cover housing 102 to a wallbox or electrical outlet box.

Figure 6:
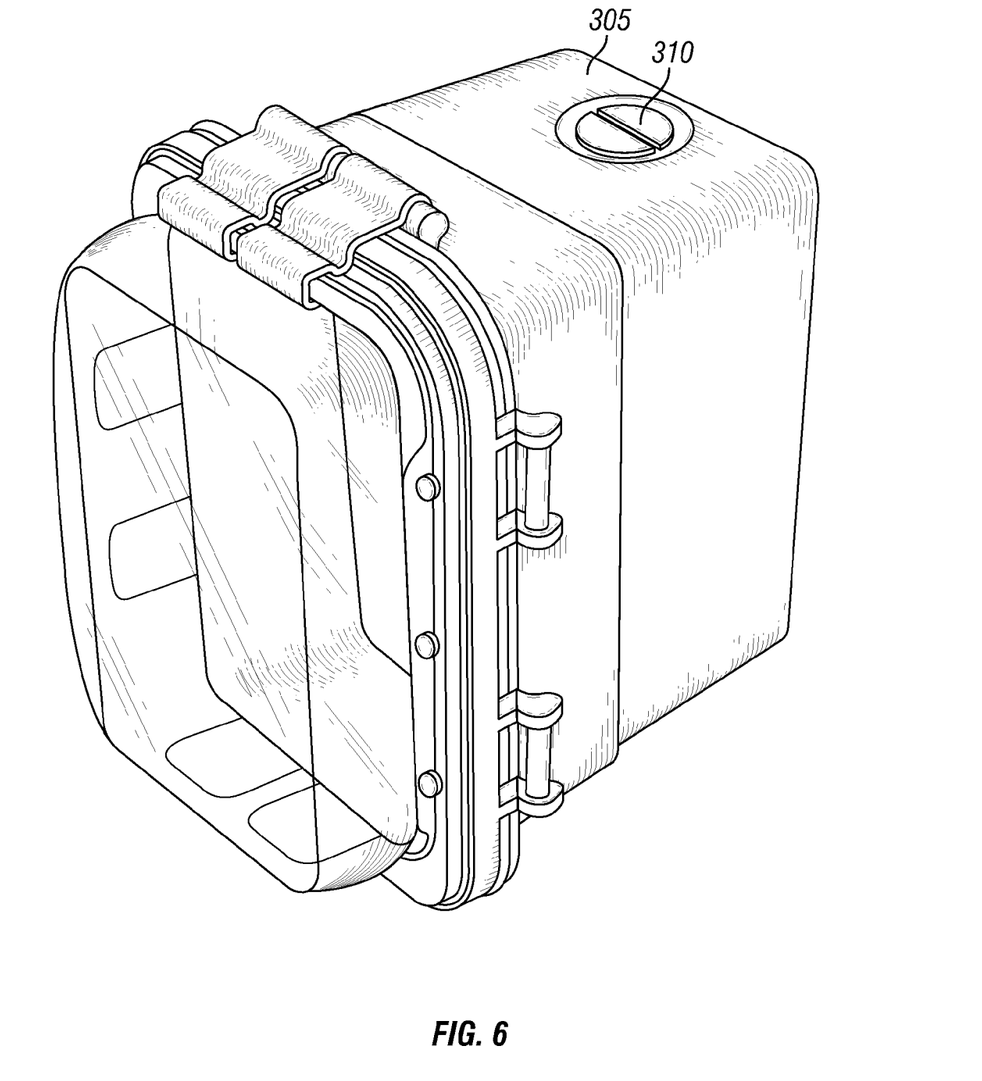
FIG. 6 is a perspective view of a sealed device with integral weatherproof cover coupled to a surface mounted conduit box according to one exemplary embodiment of the present invention.

In an alternative embodiment, the weatherproof cover 100 is mounted to a surface mounted wall box 305, as shown in FIG. 6. In this alternative mounting arrangement, the integral nature of the device 104 with the weatherproof cover 100 protects the device 104 from moisture that can enter between the weatherproof cover housing 102 and the surface mounted wallbox 305 or through the conduit openings 310 on the top, bottom (not shown), or back side (not shown) of the surface mounted wallbox 305.

Figure 4:
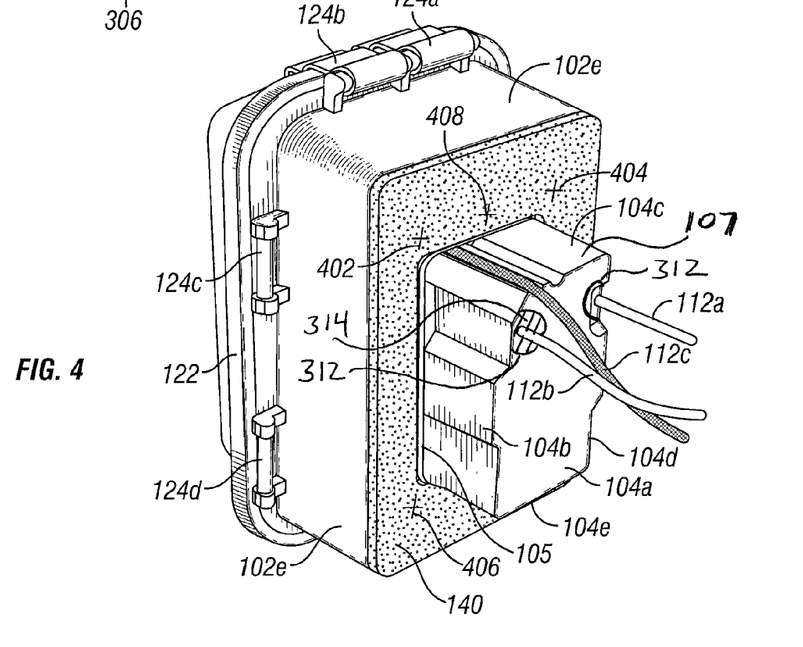
FIG. 4 is the rear perspective view of the sealed device with integral weatherproof cover of FIG. 3 further including a sealing gasket according to one exemplary embodiment of the present invention.

As shown in FIG. 3, the exemplary weatherproof cover housing 102 further includes a first pair of hinge assemblies 124a and 124b disposed collinear to each other along an outer surface of the top side wall 102e. In an alternative embodiment, as shown in FIGS. 3 and 4, another pair of hinge assemblies 124c and 124d may be positioned along an outer surface or edge of a side wall 102e of the weatherproof cover housing 102. In one exemplary embodiment, the hinge assemblies 124a, 124b, 124c, and 124d are permanently affixed to the weatherproof cover housing 102. Preferably, the hinge assemblies 124a, 124b, 124c, and 124d are molded together with the weatherproof cover housing 102 to form a unitary or integral structure. In one exemplary embodiment, the hinge assemblies 124a, 124b, 124c, and 124d include a hinge pin disposed parallel to an adjacent wall 102e of the weatherproof cover housing 102. Each end of the hinge pin is mounted on an arm that extends generally in a perpendicular manner from the outer surface of the adjacent wall 102e of the weatherproof cover housing 102.

The hinge assemblies, typically comprising a pair, may be laterally spaced-apart from each other as shown by the pair of hinge assemblies 124c and 124d. In an alternative embodiment, the hinge assemblies may be positioned immediately adjacent to each other so that the inboard ends of the two hinge pins are mounted on a common arm, as in the case of the first pair of hinge assemblies 124a and 124b. While the exemplary weatherproof cover housing 102 includes pairs of hinge assemblies, it is to be understood that a weatherproof cover housing 102 having only one hinge assembly or more than two hinge assemblies positioned on the outer surface of one of the side walls 102e is within the spirit of the present invention.

In an exemplary embodiment, the hinge assemblies 124a and 124b and/or 124c and 124d include respective biasing elements (not shown) such as, for example, torsion springs, so that the hinge assemblies 124a and 124b and/or 124c and 124d apply biasing forces against the door 122, urging the door 122 towards the weatherproof cover housing 102 to place the door 122 in the closed configuration, or to effect contact between the latching flange 138 and the tab 132.

Referring to FIG. 4, in an exemplary embodiment, the weatherproof cover 100 also includes a gasket 140 coupled to the back side 114 of the faceplate 102f of the weatherproof cover housing 102. The gasket 140 is coupled to the back side 114 of the faceplate 102f through the use of adhesives or other known methods. The gasket 140 is generally disposed between the structure wall (not shown) and the back side 114 of the faceplate 102f, and helps to limit the amount of water, or other materials, that gains access to the exterior of the device 104, the interior of the wallbox, and/or the interior of the structure wall, between the faceplate 102f and the structure wall, when the weatherproof cover 100 is coupled to the wallbox. However, those of ordinary skill in the art will recognize that, in the event of water seeping between the back side 114 of the faceplate 102f and the structure, the water, or other environmental contaminants, will not be able to enter the device 104 because the interface 105 and the openings for the wires 112a-112c are environmentally sealed. The gasket 140 includes slits 402-408 (and fifth and sixth slits not shown) that extend through the gasket 140 and are positioned substantially in-line with the mounting holes 302-308 (of FIG. 3) on the faceplate 102f. When screws or other fasteners are not placed through a particular mounting hole 302-308, the corresponding slit 402-408 in the gasket 140 remains closed and the particular mounting hole 302-308 remains sealed by the gasket 140. Conversely, when a screw or other fastener is placed through a particular mounting hole 302-308, the corresponding slit 402-408 allows the fastener to pass through the particular slit 402-408 and the gasket 140 provides a seal around the portion of the fastener that passes through the slit 402-408. In several exemplary embodiments, instead of, or in addition to the foregoing, the gasket 140 may include a wide variety of sealing elements such as, for example, an o-ring. In addition, in several exemplary embodiments, the gasket 140 may comprise a wide variety of cross-sections and/or profiles.

Figure 2:
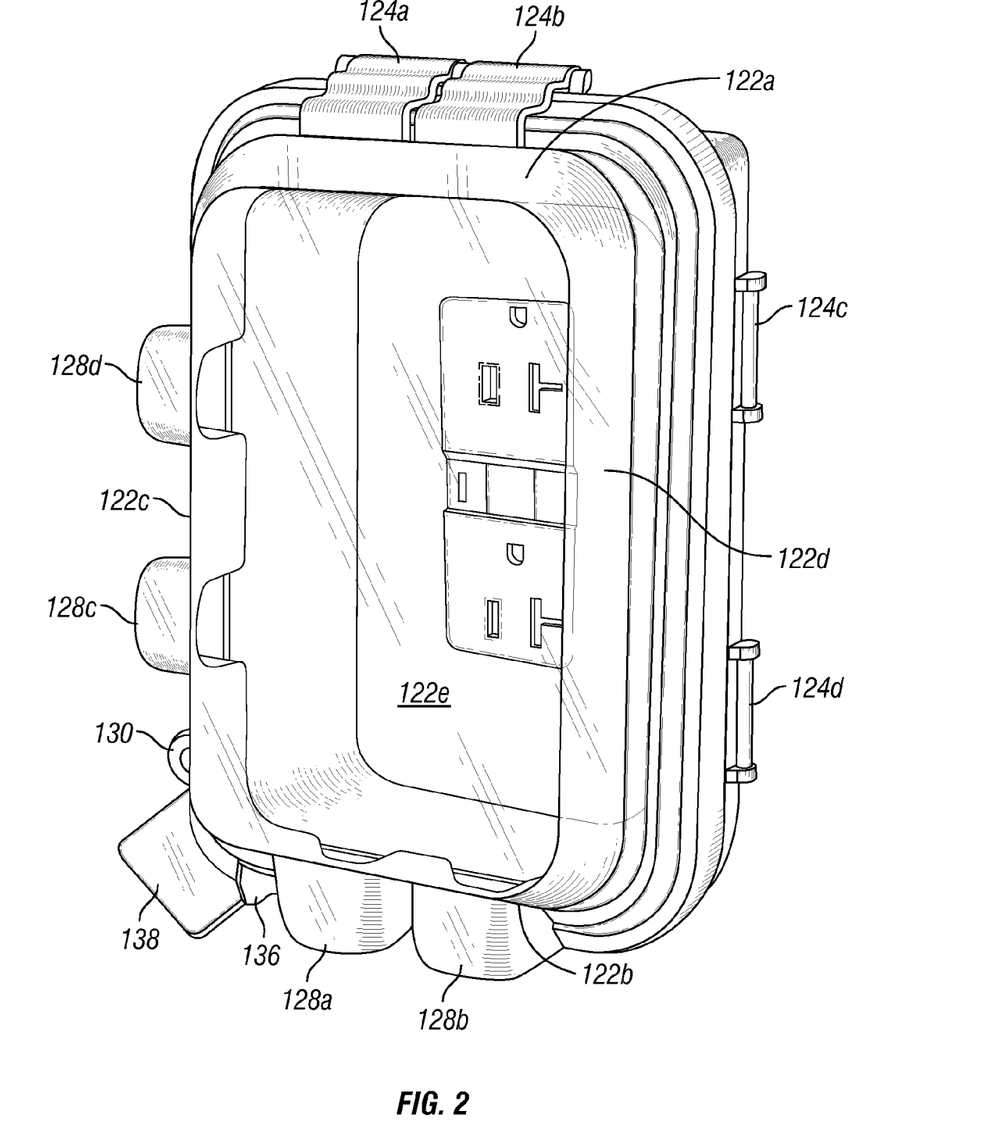
FIG. 2 is a front perspective view of the sealed device with integral weatherproof cover in a closed configuration in accordance with one exemplary embodiment of the present invention.

The exemplary weatherproof cover housing 102 of FIGS. 1-4 also includes a door 122 positioned along the front of the weatherproof cover housing 102. The door 122 has a generally box-like configuration with a front door wall 122e, a top door wall 122a, a right-side door wall 122d, a bottom door wall 122b, and a left-side door wall 122c. The top 122a, bottom 122b, right 122d, and left 122c door walls extend rearward from the front door wall 122e. Preferably the top 122a, bottom 122b, right 122d, and left 122c door walls slope outwards so that the surface area of the plane defined by the limits of the door walls is larger than the front door wall 122e. The door 122 has a length, width, and depth sufficient in size to accommodate electrical connectors generally used in the electrical industry (e.g., plugs or electrical cords) even when the door 122 is in the closed position (as shown in FIG. 2).

The door 122 is dimensioned to enable it to engage the weatherproof cover housing 102 to protect the electrical receptacles 102a and 102b from at least some environmental contaminants when the door 122 is in the closed position. The door 122 is also dimensioned to allow it to be rotatably coupled to the hinge assemblies 124a and 124b or 124c and 124d. The door 122 can be constructed by conventional methods using materials suitable for use in a weatherproof cover 100, such as composites or plastics. In one exemplary embodiment, the door 122 is molded from clear plastic, or a similarly transparent material, to allow for viewing of the interior of the weatherproof cover housing 102 even when the door 122 is in the closed position. In one exemplary embodiment, the door 122 is further dimensioned to form a weatherproof seal with the weatherproof cover housing 102 when the door 122 is in the closed position.

The door 122 further includes one or more cable openings 128a-128d to allow the connection of an electrical connector (not shown) to a device receptacle 102a and 102b. In one exemplary embodiment, the cable openings 128a-128d are covered by a removable cable cap (not shown) when not in use. The cable openings 128a-128d are dimensioned to allow a cable coupled to the electrical connector to pass through the cable opening 128a-128d when the door 122 is in the closed position. The cable openings 128a, 128b, 128c, and 128d can also be dimensioned to hold the cable of the electrical connector in place without excessive pressure or stress being applied to it. In one exemplary embodiment, the door 122 has a first pair of spaced-apart cable openings 128a and 128b and another pair of spaced-apart cable openings 128c and 128d. In one exemplary embodiment, the cable openings 128a, 128b, 128c, and 128d are generally U-shaped cut-outs extending from the lip of a door wall and into an adjacent portion of that door wall.

Figure 5A:
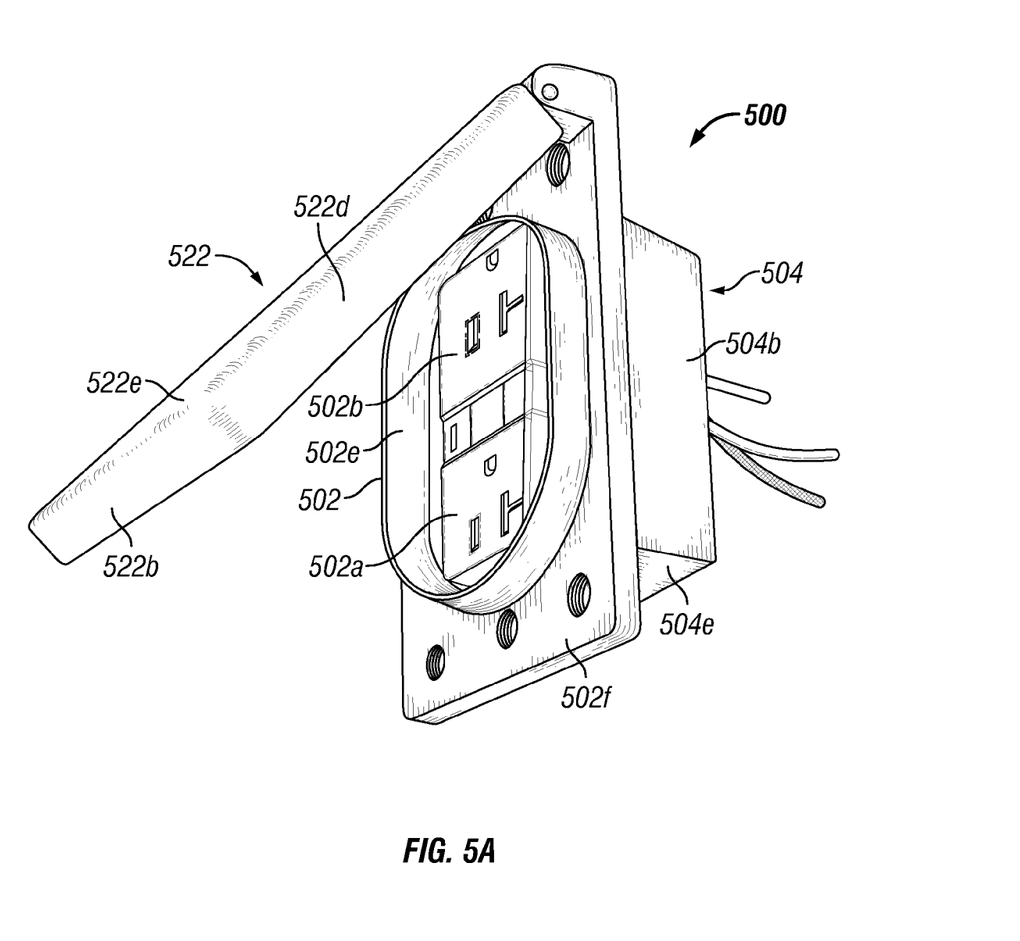
FIGS. 5A and 5B are perspective views of a weatherproof while not in use cover with integral wiring device according to an alternative exemplary embodiment of the present invention.
Figure 5B:
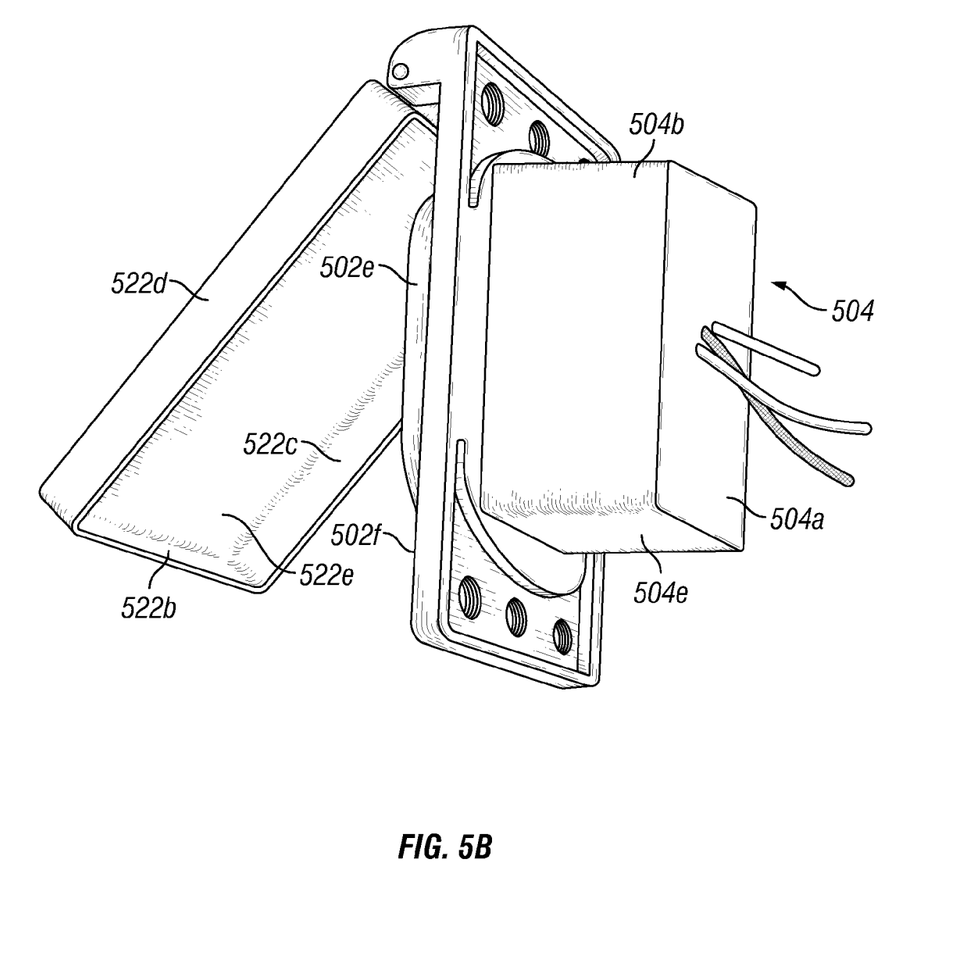

In an alternative embodiment, as shown in FIGS. 5A and 5B, the device 504 can be designed to be integral with a weatherproof while not in use cover. In the device with integral weatherproof while not in use cover 500, the weatherproof cover housing 502 includes the faceplate 502f and the wall 502e extending out therefrom. In the exemplary embodiment of FIGS. 5A and 5B, the wall 502e has an oval shape and is positioned about the device receptacles 502a and 502b. The weatherproof while not in use cover 500 is integral with the device 504 in substantially the same manner as discussed with regards to the exemplary embodiment of FIGS. 1-4 above and the device 504 is the same or substantially similar to that discussed with regards to the other embodiments herein. For example, the device 504 includes a back plate 504a having a generally rectangular shape and four walls 504b, 504c (not shown), 504d (not shown), and 504e. A door 522 is rotatably coupled to the faceplate 502f. The door 522 include sides 522a-522d that extend out from a front wall 522e of the door 522. In this alternative embodiment, the space between the front wall 522e of the door and the faceplate 502f is generally not sufficient to allow an electrical connector to be attached to the device receptacle 502a and allow the door 522 to remain in a closed configuration. However, the sides 522a-522d extend out from the front wall 522e towards the faceplate 502f a sufficient amount such that sides 522a-522d overlap the plane of the faceplate 502f to help exclude rain from entering in between the door 522 and the faceplate 502f.

Returning to FIGS. 1-4, The weatherproof cover housing 102 can also include a latch mechanism to help keep the door 122 in the closed position. The latch mechanism includes a tab 132 extending outwards from an outer surface of the weatherproof cover housing 102. In one exemplary embodiment, the tab 132 is positioned on a bottom corner of the weatherproof cover housing 102 which is not adjacent to a hinge assembly. The latch mechanism 132 also includes a latch flange 138 extending outward from the outer surface of the door 122 adjacent to the door opening. The latch flange 138 extends outward from the door 122, at a distance sufficient to allow the distal end of the latch flange 138 to engage the tab 132 when the door 122 is in the closed position. In one exemplary embodiment, as the door 122 is moved into the closed position, the latch flange 138 engages the tab 132. A latch handle (part of the latch flange 138 shown in FIG. 2) extends outward from the distal end of the latch flange 138 to assist in opening and closing the door 122. The latch mechanism 132 is released by pulling the handle in the direction of pivoting movement of the door 122.

The latch mechanism 132 can also include a locking assembly to prevent access to the device receptacles 102a and 102b. The locking assembly can include an upper padlock hole 130 in the latch flange 138 and a lower padlock hole 134 in the tab 132. The padlock holes 130 and 134 register with each other when the door 122 is in the closed position. A suitable locking device (not shown), such as a padlock, may be placed through the padlock holes 130 and 134 to lock the door 122 in the closed position to the weatherproof cover housing 102.

As discussed above, the door 122 is rotatably coupled to the weatherproof cover housing 102 by way of the hinge assemblies 124a and 124b or 124c and 124d, which allow the door 122 to be manipulated from an open position, as shown in FIG. 1, to a closed position, as shown in FIG. 2. Furthermore, in certain exemplary embodiments, one or more sealing elements (not shown) such as, for example, gaskets, may be coupled to the door 122 so that, when the door 122 is in the closed configuration, the gaskets sealingly engage the door 122 and the walls 102e of the weatherproof cover housing 102. In an alternative exemplary embodiment, one or more sealing elements (not shown) such as, for example, gaskets, may be coupled to one or more of the walls 102e of the weatherproof cover housing 102 so that, when the door 122 is in the closed configuration, the gaskets sealingly engage the door 122 and the walls 102e.

In the exemplary weatherproof cover 100, a single gang receptacle 102a and 102b is included along the front face of the device 104 and a portion of the single gang receptacle 102a and 102b is positioned within the volume defined by the side walls 102e and the faceplate 102f. The faceplate 102f includes an opening 114a through which the electrical receptacles 102a and 102b are adapted to extend through or provide accessibility to through the use of a plug or other electrical connector. The shape of the opening 114a is generally rectangular, but can take on other geometric shapes based on the needs of the particular application and the shape of the electrical receptacles 102a and 102b.

In an exemplary embodiment, the weatherproof cover 100 is installed in a conventional manner in an outdoor environment, an indoor environment and/or any combination thereof. In operation, the device 104 operates, in a conventional manner, as a GFCI device. The environmental sealing of the device 104 to the weatherproof cover housing 102 provides a generally weatherproof or weather-resistant seal, generally preventing foreign material such as, liquid, water, rainwater, wind-driven rainwater, or other environmental contaminants from passing between the weatherproof cover housing 102 and the device 104. In addition, environmentally sealing the wire leads 112a, 112b, and 112c provides a generally weatherproof or weather-resistant seal from foreign material, such as water, rainwater, wind-driven rainwater, or other environmental contaminants that have passed between the structure wall (not shown) and the back side 114 of the faceplate 102f and prevents that material from accessing the interior of the device 104.

In certain exemplary embodiments, instead of, or in addition to a GFCI device, the weatherproof cover 100 may be in the form of, and/or include, a wide variety of electrical devices and/or combinations thereof, including, for example, a wide variety of wiring devices, a wide variety of combination devices, a wide variety of duplex-style combination devices, a wide variety of decorator-style combination devices, one or more nightlights, one or more single-pole switches, one or more receptacle outlets, one or more dimmers, one or more three-way switches, one or more single-pole double combination switches, one or more single-pole triple combination switches, and other receptacles, and/or any combination thereof.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A weatherproof electrical enclosure comprising:
   a wiring device comprising:
   a device body comprising a plurality of side walls;
   a plurality of electrical wires, a first end of each of the wires being electrically coupled to the wiring device and disposed within the device body and each opposing end of the wire extending through an aperture in at least one of the plurality of side walls of the device body, each of said apertures being environmentally sealed;
   a weatherproof cover housing comprising;
   a faceplate and a plurality of side walls extending from the faceplate;
   a first aperture disposed through the faceplate and a second aperture defined by said side walls, the faceplate of the weatherproof cover coupled to the one of the plurality of sides walls of the device body and comprising an environmental seal between the faceplate of the weatherproof cover and at least a portion of one of the side walls of the device body, wherein a portion of the wiring device is disposed adjacent and through the first aperture; and
   a door rotatably adjustable from an open configuration to a closed configuration, wherein the door is coupled to the weatherproof cover and disposed adjacent to the second aperture in the closed configuration.

2. The weatherproof electrical enclosure of claim 1, further comprising a gasket disposed about the first aperture and at least a portion of the wiring device, wherein the gasket promotes an environmental seal between the weatherproof cover and a wall of a support structure.

3. The weatherproof electrical enclosure of claim 2, wherein the gasket is coupled to the faceplates of the weatherproof cover.

4. The weatherproof electrical enclosure of claim 1, wherein the weatherproof cover comprises:
   the faceplate having a first side and a second side and the first aperture, wherein a portion of the first side of the faceplate is disposed against the wiring device.

5. The weatherproof electrical enclosure of claim 4, wherein the door comprises a front door wall, and a plurality of side door walls, wherein the front door wall and side door walls define a door opening.

6. The weatherproof electrical enclosure of claim 5, wherein the door further comprises at least one cable opening disposed in at least one of the side door walls.

7. The weatherproof electrical enclosure of claim 5, further comprising at least one hinge assembly having a first end and a second end, wherein the first end of the hinge assembly is coupled to at least one of the plurality of walls of said weatherproof cover housing extending out from the second side of the faceplate and the second end of the hinge assembly is coupled to at least one of the side door walls.

8. The weatherproof electrical enclosure of claim 5, further comprising a latch mechanism comprising:
   a tab extending outwards from at least one of the walls of the weatherproof cover; and
   a latch flange extending outward from at least one of the side door walls; wherein the latch flange extends from the door at a distance sufficient to allow the latch flange to engage the tab when the door is in a closed position.

9. The weatherproof electrical enclosure of claim 1, wherein the open door comprises:
   the open configuration in which access to a front portion of the wiring device is generally permitted; and
   the closed configuration in which access to the front portion of the wiring device is generally prevented and weather resistance is generally provided.

10. The weatherproof electrical enclosure of claim 1, wherein the wiring device comprises a ground fault circuit interrupter ("GFCI") device.

11. The weatherproof electrical enclosure of claim 1, wherein the wiring device and the weatherproof cover comprise an exterior comprising a unitary molded plastic weatherproof cover.

12. The weatherproof electrical enclosure of claim 1, further comprising an adhesive disposed between the wiring device and the weatherproof cover creating the environmental seal between the wiring device and the weatherproof cover.

13. The weatherproof electrical enclosure of claim 1, wherein the apertures in the wiring device for the plurality of electrical wires are environmentally sealed with one of solvent, welding, ultrasonic welding, pressure fitting, or cork.

14. The weatherproof electrical enclosure of claim 1, wherein the apertures in the wiring device for the plurality of electrical wires are environmentally sealed with one of sealant, caulk, an o-ring, a gasket material, or a membrane.

15. The weatherproof electrical enclosure of claim 1, wherein the apertures in the wiring device for the plurality of electrical wires are environmentally sealed with caulk comprising silicone rubber.

16. A weatherproof electrical enclosure comprising:
   a wiring device comprising:
      at least one electrical receptacle to allow for releasably coupling a plug;
      a device body comprising a plurality of sides; and
      a plurality of electrical wires, each wire comprising a first end positioned within the device body, a second end disposed outside of the device body, and an intermediate portion disposed therebetween;
      wherein the first end is electrically coupled to the electrical receptacle within the device body and the intermediate portion extends through an aperture in at least one of the plurality of sides of the device body, each of said apertures being environmentally sealed;
   a recessed weatherproof cover housing comprising;
      a faceplate and a plurality of side walls coupled to the faceplate;
      a first aperture in the faceplate; and
      a second aperture defined by said side walls;
   the weatherproof cover housing integral with the wiring device and having the faceplate disposed adjacent one of the sides of the device body, wherein the integral weatherproof cover housing and wiring device comprise an environmental seal therebetween,
   wherein the electrical receptacle is disposed adjacent the first aperture in the faceplate; and
   a door rotatably coupled to the weatherproof cover, said door operable between an open position and a closed position, wherein the door is disposed adjacent to the second aperture in the closed position.

17. The weatherproof electrical enclosure of claim 16, wherein the weatherproof cover comprises:
   the faceplate having a back side and a front side and the first aperture, wherein at least a portion of the back side of the faceplate is disposed against a portion of the wiring device.

18. The weatherproof electrical enclosure of claim 17, wherein the door comprises:
   a front door wall;
   a plurality of side door walls coupled to the front door wall; and
   at least one cable opening disposed along an edge of one of the side door walls;
   wherein each of said side door walls extends out from the front door wall and is disposed adjacent to at least one of the walls of the weatherproof cover when the door is in the closed position.

19. The weatherproof electrical enclosure of claim 18, further comprising a plurality of hinge assemblies, each hinge assembly comprising a first end and a second end, wherein the first end is coupled to one of the walls of the weatherproof cover and the second end is coupled to one of the side door walls and wherein said door is capable of rotating about each of said hinge assemblies.

20. The weatherproof electrical enclosure of claim 18, further comprising a latch mechanism comprising:
   a tab extending outwards from at least one of the walls of the weatherproof cover;
   a latch flange extending outward from at least one of the side door walls; and
   a locking assembly comprising:
      an upper padlock aperture disposed in the latch flange; and
      a lower padlock aperture disposed in the tab;
   wherein the latch flange extends from the door at a distance sufficient to allow the latch flange to engage the tab when the door is in a closed position; and
   wherein the upper and lower padlock holes register with each other when the door is in the closed position.

* * * * *

UNITED STATES PATENT AND TRADEMARK OFFICE
CERTIFICATE OF CORRECTION

| | |
|---|---|
| PATENT NO. | : 7,947,901 B2 |
| APPLICATION NO. | : 12/242042 |
| DATED | : May 24, 2011 |
| INVENTOR(S) | : Howard S. Leopold |

Page 1 of 1

It is certified that error appears in the above-identified patent and that said Letters Patent is hereby corrected as shown below:

Claim 3, column 10, line 11, "wherein the gasket is coupled to the faceplates of the weather-" should be changed to -- wherein the gasket is coupled to the faceplate of the weather- --

Signed and Sealed this
Twenty-sixth Day of July, 2011

David J. Kappos
*Director of the United States Patent and Trademark Office*